United States Patent

[11] 3,610,910

[72] Inventor Anthony John Shawcross Udall
Ashford, England
[21] Appl. No. 820,371
[22] Filed Apr. 30, 1969
[45] Patented Oct. 5, 1971
[73] Assignee Electric & Musical Industries Limited
Hayes, Middlesex, England
[32] Priority May 1, 1969
[33] Great Britain
[31] 20,609/68

[54] TIME-DIVISION MULTIPLYING CIRCUIT ARRANGEMENTS WITH PHASE COMPENSATION
4 Claims, 1 Drawing Fig.

[52] U.S. Cl. .......... 235/194, 328/160, 328/155
[51] Int. Cl. .......... G06g 7/16
[50] Field of Search .......... 235/194, 195, 196, 193, 197; 328/160, 161, 149, 55, 155

[56] References Cited
UNITED STATES PATENTS

| | | | |
|---|---|---|---|
| 3,013,724 | 12/1961 | Thompson et al. | 235/194 |
| 3,294,961 | 12/1966 | Hose | 235/194 X |
| 3,321,614 | 5/1967 | Levadi | 235/194 |
| 3,358,129 | 12/1967 | Schultz | 235/194 |
| 3,465,136 | 9/1969 | Dailey et al. | 235/194 |
| 3,466,460 | 9/1969 | Connolly | 235/194 X |
| 2,842,664 | 7/1958 | Martin | 235/194 UX |
| 3,465,276 | 9/1969 | Silva et al. | 328/155 X |
| 3,492,471 | 1/1970 | Crowell | 235/194 |
| 3,492,506 | 1/1970 | Martin et al. | 328/155 X |

*Primary Examiner*—Malcolm A. Morrison
*Assistant Examiner*—Joseph F. Ruggiero
*Attorney*—William W. Downing, Jr.

ABSTRACT: There is provided an electrical analogue multiplying circuit arrangement for multiplying a first quantity, represented by a first electrical analogue input signal and a second quantity, represented by a second electrical analogue input signal. Time delays introduced between the application of said two input signals and the production of the output signal representing the product of said two input signals corresponding to phase lags in smoothing circuits are at least partly compensated by the addition of transfer circuits arranged to shift the phase of said input signals forward by an amount approximately equal to said phase lags.

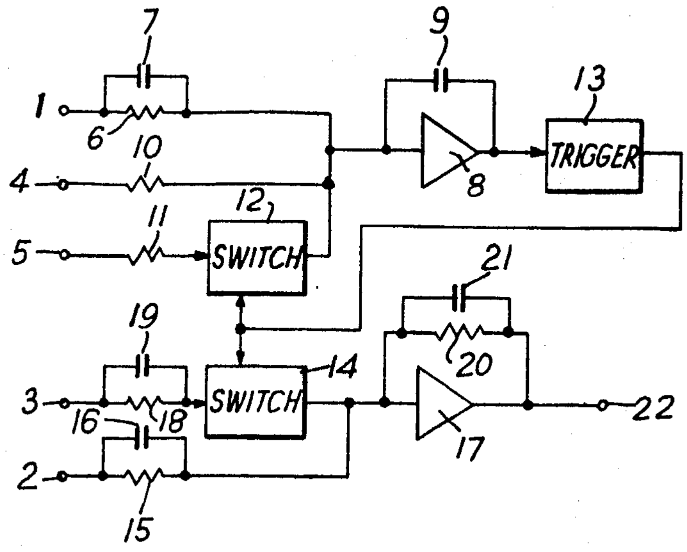
TRIGGER
SWITCH
SWITCH

TIME-DIVISION MULTIPLYING CIRCUIT ARRANGEMENTS WITH PHASE COMPENSATION

The present invention relates to multiplying circuit arrangements for producing an electrical signal representing the product of a first quantity, represented by a first electrical analogue signal, and a second quantity, represented by a second electrical analogue signal, and relates especially, but not exclusively, to such multiplying circuit arrangements as are known as time division multipliers in which there is produced a rectangular waveform having alternate positive and negative going portions of value proportional to the second analog signal and having a mark-to-space ratio representing the first analogue signal. When this rectangular waveform is smoothed a voltage is produced representing the product of the two analogue signals.

However, in such a circuit, the process of smoothing the rectangular waveform introduces lags in the overall response of the multiplier which can be undesirable, especially when the multiplier is included in a servocontrol loop or if several stages of multiplication are required so that the lags become cumulative.

It an object of the present invention to provide a multiplying circuit arrangement in which the above disadvantage is at least partially reduced.

According to the present invention there is provided an electrical analogue multiplying circuit arrangement comprising:

a. a first input terminal adapted to receive a first electrical analogue input signal, b. control means for generating at its output a rectangular switching waveform having a mark-to-space ratio dependent upon said first input signal, c. a first transfer circuit for coupling said first input terminal to the said control means, d. second and third input terminals, one of which is adapted to receive a second electrical analogue input signal and the other of which is adapted to receive the negative of said second input signal, e. a smoothing circuit having its output coupled to an output terminal of the arrangement, f. a second transfer circuit for coupling said second input terminal to the input of said smoothing circuit, g. the series combination of a third transfer circuit and first switching means adapted to be controlled by said switching waveform, for coupling said third input terminal to the input of said smoothing circuit, and h. elements included in said first, second and third transfer circuits, for advancing the phase of electrical signals applied thereto, the respective elements being so dimensioned as to compensate, at least in part, for phase lags introduced by said smoothing circuit.

Ideally the response of the multiplier to two input signals $x$ and $y$ is to produce an output signal $z$ equal to $xy$. However, with a time division multiplier including a smoothing filter there are introduced lags into the response of the multiplier so that the output signal $z$ of the multiplier is equal to $xy-\dot{z}t$ where $t$ represents the time lag introduced by the filter. In accordance with the present invention phase-shifting circuits are included in the input circuits for the $x$ and $y$ signals of the multiplier so that the equation of the multiplier becomes $z+\dot{z}t$ equal to $(x+\dot{x}t)(y+\dot{y}t)$, which equation may be rearranged.

$$z=xy+(\dot{x}y+x\dot{y}-\dot{z})t+\dot{x}\dot{y}t^2 \ . \ . \ . \qquad (1)$$

If this last equation is differentiated with respect to $t$ and multiplied by $t$, an equation for $\dot{z}t$ is obtained which, when substituted for $\dot{z}t$ in equation (1), produces a new equation for $z$ which includes no first order term in $t$, therefore reducing lag errors to those of second and higher orders in $t$, without influencing the effectiveness of the smoothing filter.

In order that the invention may be fully understood and readily carried into effect it will now be described with reference to the accompanying drawing, the single figure of which shows in diagrammatic form one example of a multiplying circuit arrangement according to the present invention.

Referring now to the drawing the arrangement shown has an input terminal 1 for a first signal, $x$, and input terminals 2 and 3 for the positive and negative of a second analogue signal, $y$ and $-y$ respectively. Two further input terminals 4 and 5 are provided respectively for the positive and negative of a constant signal $k$, the arrangement being such that $|x|\leq k$. The input terminal 1 is connected via a phase-advancing filter consisting of resistor 6 and capacitor 7 in parallel with it to an integrating circuit consisting of DC inverting amplifier 8 and feedback capacitor 9. The input terminal 4 is connected to the input of the integrating circuit via resistor 10, and the input terminal 5 is connected via resistor 11 and switch 12 to the input of the integrating circuit. The output of the integrating circuit drives a trigger circuit 13 which assumes a first stable state when the output of the integrating circuit rises to a first threshold level, and maintains that state until the output of the integrating circuit falls to a second threshold level, when the trigger assumes a second stable state which it maintains until the output of the integrating circuit rises to the first threshold level again. The output of the trigger circuit 13 is connected to operate the switch 12 and another switch 14, the two switches being enabled to pass signals from terminal 5 when circuit 13 assumes its first stable state, and disabled from doing so when the circuit 13 assumes its second stable state. The input terminal 2 for the positive of the second analogue signal is connected via a phase advancing filter consisting of resistor 15 and capacitor 16 connected in parallel to the input of summing amplifier 17. The input terminal 3 which receives the negative of the second analogue signal, is connected via phase-advancing filter consisting of resistor 18 and capacitor 19 connected in parallel, and switch 14 to the input of the amplifier 17. The amplifier 17 is provided with a feedback resistor 20 and a smoothing capacitor 21. The output of the amplifier 17 is connected to the output terminal 22 at which the product signal is set up.

The integrating circuit, consisting of amplifier 8 and capacitor 9, the trigger 13 and the switch 12 from a loop which operates as a rectangular wave generator for the operation of switch 14. Suppose that initially switch 12 is closed to the passage of signals from terminal 5, the circuit 13 being in its second stable state the input to the integrator therefore consists of the first analogue signal $x$ and the constant signal $+k$ applied respectively through equal resistors 6 and 10. Then the output signal of the integrator will increase at a rate proportional to $x+k$ until the first threshold level of circuit 13 is reached. Circuit 13 then changes to its first stable state and open the switch 12 to the passage of signals. The resistor 11 is of half the value of the resistor 10 and when the switch 12 is opened to the passage of signals the output signal of the integrator circuit decreases at a rate proportional to $x+k-2k$, that is $x-k$ until the second threshold level of circuit 13 is reached. Circuit 13 then reverts to its second stable state and closes the switch 12 to the passage of signals. It will be understood therefore that the output signal of the trigger 13 is a rectangular wave having a mark-to-space ratio of $k+x$:$k-x$, and since switches 12 and 14 are operated in synchronism, the input current to the summing amplifier 17 also has a rectangular waveform of the same mark-to-space ratio as the output waveform of the trigger 13. However the amplitude of the said current is proportional to $y$ the second analogue signal, since the resistor 18 is of half the value of resistor 15. For a rectangular wave having a mark-to-space ratio of $k+x$:$k-x$ and an amplitude of $y$ it can be shown that the smoothed level of the waveform is proportional to $xy$, so that the output signal set up at the terminal 22 is proportional to the product $xy$ of the first and second analogue signals. The capacitor 21 serves to smooth the rectangular waveform which would otherwise be set up at the output of the amplifier 17 and the smoothing circuit so produced must have a sufficiently long time constant for the effective smoothing of the rectangular wave to produce a smoothly varying product signal.

In accordance with the invention the capacitors 7, 16 and 19 which are connected in parallel with the input resistors 6, 15 and 18 respectively for the first analogue signal the second analog signal and the negative of the second analogue signal, have values which are chosen in relation to the values of the resistors across which they are connected to produce phase advances of the respective signals which match the phase lag introduced by the smoothing capacitor 21 connected in parallel with the resistor 20. To achieve this result the time constant of the circuits 6, 7; 15, 16; 18, 19 and 20, 21 are all arranged to be equal.

What I claim is:

1. An electrical analogue multiplying circuit arrangement comprising:

a. a first input terminal adapted to receive a first electrical analogue input signal,
b. control means for generating at its output a rectangular switching waveform having a mark-to-space ratio dependent upon said first input signal,
c. a first transfer circuit for coupling said first input terminal to the said control means,
d. second and third input terminals, one of which is adapted to receive a second electrical analogue input signal and the other of which is adapted to receive the negative of said second input signal,
e. a smoothing circuit having its output coupled to an output terminal of the arrangement,
f. a second transfer circuit for coupling said second input terminal to the input of said smoothing circuit,
g. the series combination of a third transfer circuit and first switching means adapted to be controlled by said switching waveform, for coupling said third input terminal to the input of said smoothing circuit, and
h. elements, included in said first, second and third transfer circuits, for advancing the phase of electrical signals applied thereto, the respective elements being so dimensioned as to compensate, at least in part, for phase lags introduced by said smoothing circuit.

2. An electrical analog multiplying circuit arrangement according to claim 1 in which the said control means comprises:

a. an integrating circuit having its input coupled to said first transfer circuit,
b. first and second control input terminals, one of which is adapted to receive a positive control voltage of substantially constant amplitude and the other of which is adapted to receive the negative of said control voltage,
c. means coupling said first control input terminal to the input of said integrating circuit,
d. means including second switching means, adapted to be controlled by said switching waveform, for coupling said second control input terminal to the input of said integrating circuit,
e. a bistable trigger circuit, the output of which constitutes the output of said control means, and
f. means connecting the output of said integrating circuit to the input of said trigger circuit.

3. An electrical analogue multiplying circuit arrangement according to claim 1 in which said transfer circuits comprise a combination of resistors and capacitors, the latter representing said phase-shifting means.

4. An electrical analog multiplying circuit arrangement according to claim 3 in which the time constant of each of said transfer circuits is arranged to equal the time constant of said smoothing circuit.